(12) United States Patent
Record et al.

(10) Patent No.: US 11,235,226 B2
(45) Date of Patent: Feb. 1, 2022

(54) STAND-AND-SPRAY FOAM DELIVERY METHOD AND DEVICE THEREOF

(71) Applicant: Jason Record, Cumberland, ME (US)

(72) Inventors: Jason Record, Cumberland, ME (US); Todd Sniper, Portland, ME (US)

(73) Assignee: Jason Record, Cumberland, ME (US)

( * ) Notice: Subject to any disclaimer, the term of this patent is extended or adjusted under 35 U.S.C. 154(b) by 135 days.

(21) Appl. No.: 16/067,359

(22) PCT Filed: Jan. 11, 2017

(86) PCT No.: PCT/US2017/012901
§ 371 (c)(1),
(2) Date: Jun. 29, 2018

(87) PCT Pub. No.: WO2017/123565
PCT Pub. Date: Jul. 20, 2017

(65) Prior Publication Data
US 2019/0015733 A1    Jan. 17, 2019

Related U.S. Application Data

(60) Provisional application No. 62/278,005, filed on Jan. 13, 2016.

(51) Int. Cl.
| | | |
|---|---|---|
| *A63C 19/06* | (2006.01) |
| *C09D 5/02* | (2006.01) |
| *B65D 83/20* | (2006.01) |
| *C09D 5/44* | (2006.01) |
| *B05D 1/02* | (2006.01) |

(52) U.S. Cl.
CPC .............. *A63C 19/065* (2013.01); *B05D 1/02* (2013.01); *B65D 83/206* (2013.01); *C09D 5/02* (2013.01); *C09D 5/4419* (2013.01)

(58) Field of Classification Search
CPC ....... A63C 19/065; B05D 1/02; B65D 83/206
See application file for complete search history.

(56) References Cited

U.S. PATENT DOCUMENTS

| | | | | |
|---|---|---|---|---|
| 4,991,751 | A * | 2/1991 | Naku .................. | B65D 83/205 222/402.13 |
| 6,161,735 | A * | 12/2000 | Uchiyama ............ | B65D 83/205 222/402.13 |
| 2004/0221766 | A1 | 11/2004 | Vilarinho Dias | |
| 2005/0284897 | A1* | 12/2005 | Kutsch .................. | B65D 83/28 222/649 |
| 2009/0032618 | A1 | 2/2009 | Hornsby | |

(Continued)

FOREIGN PATENT DOCUMENTS

EP    2457622 A1    5/2012

*Primary Examiner* — Nathan T Leong
(74) *Attorney, Agent, or Firm* — Jeffrey Joyce, Esq.

(57) ABSTRACT

A stand-and-spray foam delivery method and device for creating a foam line on a hard surface, such as an athletic playing field, while a user is standing in an upright position. The method provides a vanishing foam formula comprising a relatively high level of surfactant in an aerosol can having an actuator device with a cylindrical actuator orifice that has a round opening and long and straight sidewalls. Actuating the device causes the formula to exit the aerosol can through the actuator orifice without agitation thus maintaining a stream of formula that does not turn to foam until it contacts a surface

7 Claims, 6 Drawing Sheets

(56) References Cited

U.S. PATENT DOCUMENTS

| | | |
|---|---|---|
| 2011/0256070 A1 | 10/2011 | Martin et al. |
| 2012/0148741 A1 | 6/2012 | Silva |
| 2014/0037854 A1* | 2/2014 | Tait .................. C09D 123/0853 427/427 |

* cited by examiner

STAND-AND-SPRAY FOAM DELIVERY METHOD AND DEVICE THEREOF

BACKGROUND INFORMATION

Field of the Invention

The invention relates to foam sprays and devices for the application of such a spray, particularly those that are used to make temporary markings on hard surfaces such as the ground, floor or a playing field.

Background of the Invention

Vanishing sprays and vanishing foams are known substances that are frequently used on athletic fields and other surfaces in order to provide a temporary visual marker. The spray is applied from an aerosol can, which is typically small enough to comfortably fit in the user's hand and attach to a holster on user's belt. In order for the foam to be useful, it must create a neat and well defined line that is readily visible and that, depending on the style of actuator, measures on average 1 to 4 inches in width.

Generally, the foam is created from a liquid mixture that is roughly 80% water, between 4% and 18% propellant (such as butane gas), roughly 1% to 2% surfactant, with the remainder generally comprising preservatives. As the liquid mixture agitates and boils at atmospheric pressure it expands into foam that is typically visible for one to five minutes. In the conventional delivery systems the mixture begins to agitate and boil, thereby beginning the transformation from liquid to foam, as it passes through the actuator, completing the transition from liquid to foam in the air shortly after leaving the can and generally prior to contacting the surface. The conventional actuator has an actuator orifice that is approximately between 3 and 6 millimeters wide, that is curved or angled, and that is bent or partially obstructed so as to create agitation within the actuator.

As a result of the conventional formula and delivery system, a user must hold the can very near to the ground, typically between two and twelve inches above the surface, to apply the spray and create a useful line on the surface. If the user holds the can any further from the surface the foam results in a wide pattern, ranging on average between at least six inches in width and sometimes measuring over a foot in width on the ground, forming something that resembles a splattering pattern, that is unusable as a reference line, with an inconsistent and sparse concentration of foam, as opposed to the neat and well-formed foam line of highly visible foam that is practical to use. An example of such an ill-formed line is illustrated in FIG. 7.

What is needed, therefore, is a vanishing foam formula and delivery device that allows a user to create a neat and well-formed foam line from an upright standing position.

BRIEF SUMMARY OF THE INVENTION

The invention is an applicator device and vanishing foam formula that allows a user to stand upright and spray a neat and well-formed line of foam having little or no splattering or overspray on a surface, the line measuring on average between one and two inches in width and being easy to see from a standing position.

The applicator device combines a conventional foam-dispensing aerosol can and conventional foam-dispensing valve with an actuator that has a comparatively long and narrow actuator orifice having a cylindrical shape with a round opening and straight sidewalls. The design of the actuator and composition of the formula allow for a narrow spray of the formula that experiences little to no agitation as it leaves the applicator device, thus allowing the agitation and, consequently, the foaming to occur when the spray contacts a surface, such as the ground or the surface of a playing field. The design of the actuator requires that the aerosol can be held in an inverted position to apply the foam to a lower surface. As a result of the applicator device and the formula, the user is able to stand upright and spray a neat foam line having little to no splattering or overspray and maintaining a usable width and density on the surface.

The vanishing foam formula contains a higher level of surfactant than is found in the conventional formulas so as to provide for sufficient foaming when the formula hits the ground. Such surfactant is not needed with the conventional foam sprays because the conventional foam delivery systems cause significant agitation and foaming to begin as the formula passes through the actuator, which consequently allows for significant foaming to occur prior to the mixture coming into contact with the surface.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-5 illustrate the delivery device 100 according to the invention including a conventional aerosol can 10, an actuator 20, and a valve 40.

Figure 1:
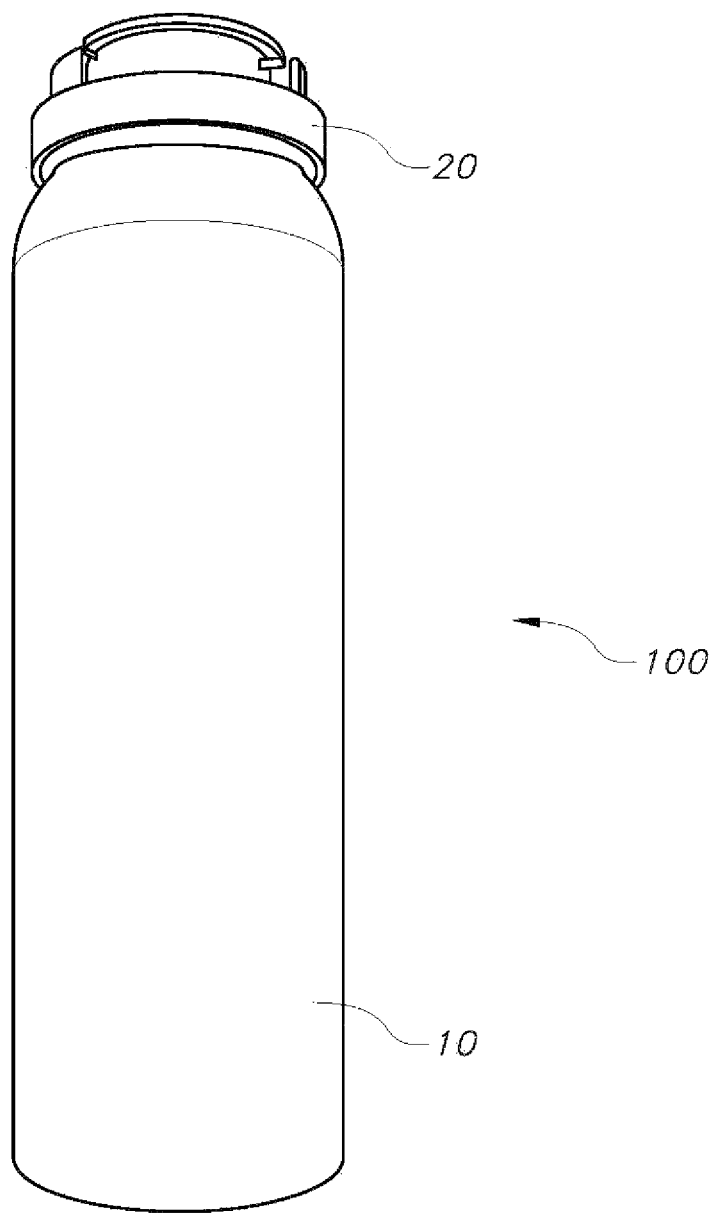
FIG. 1 is a side view of the spray device according to the invention.
Figure 2:
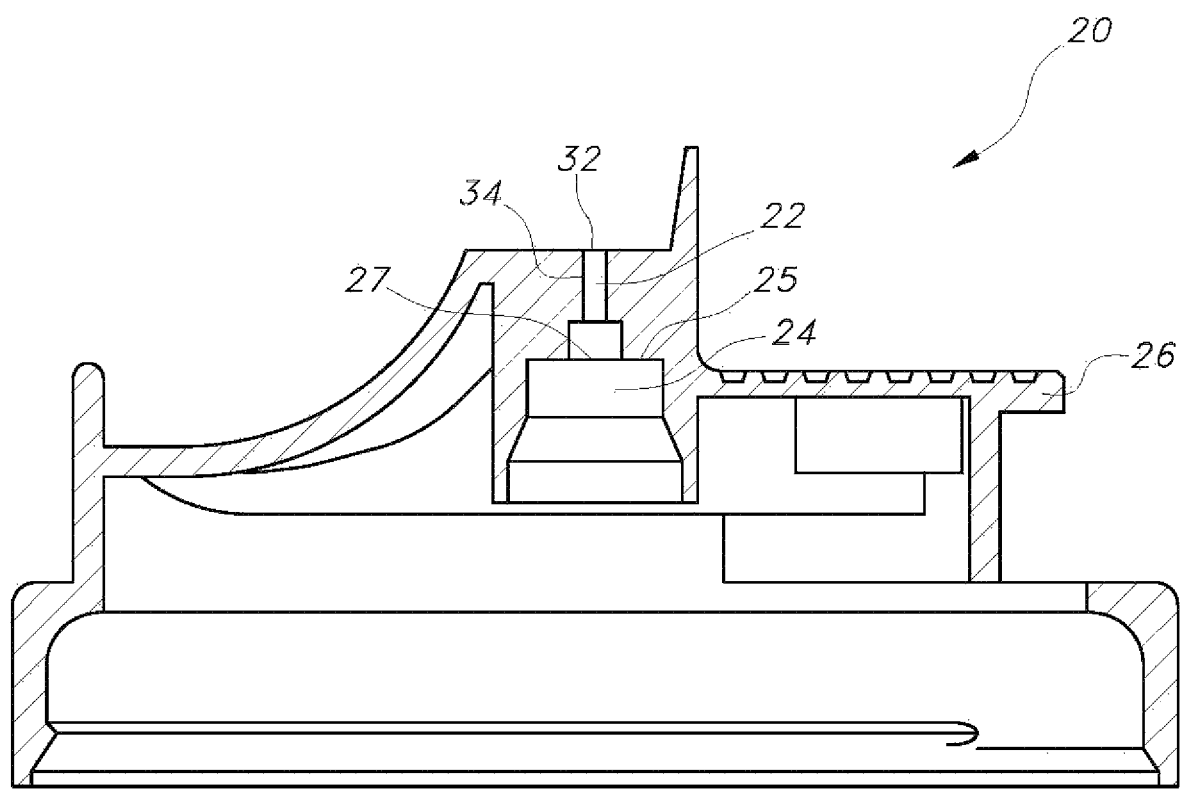
FIG. 2 is a cross section view of the actuator.
Figure 3:
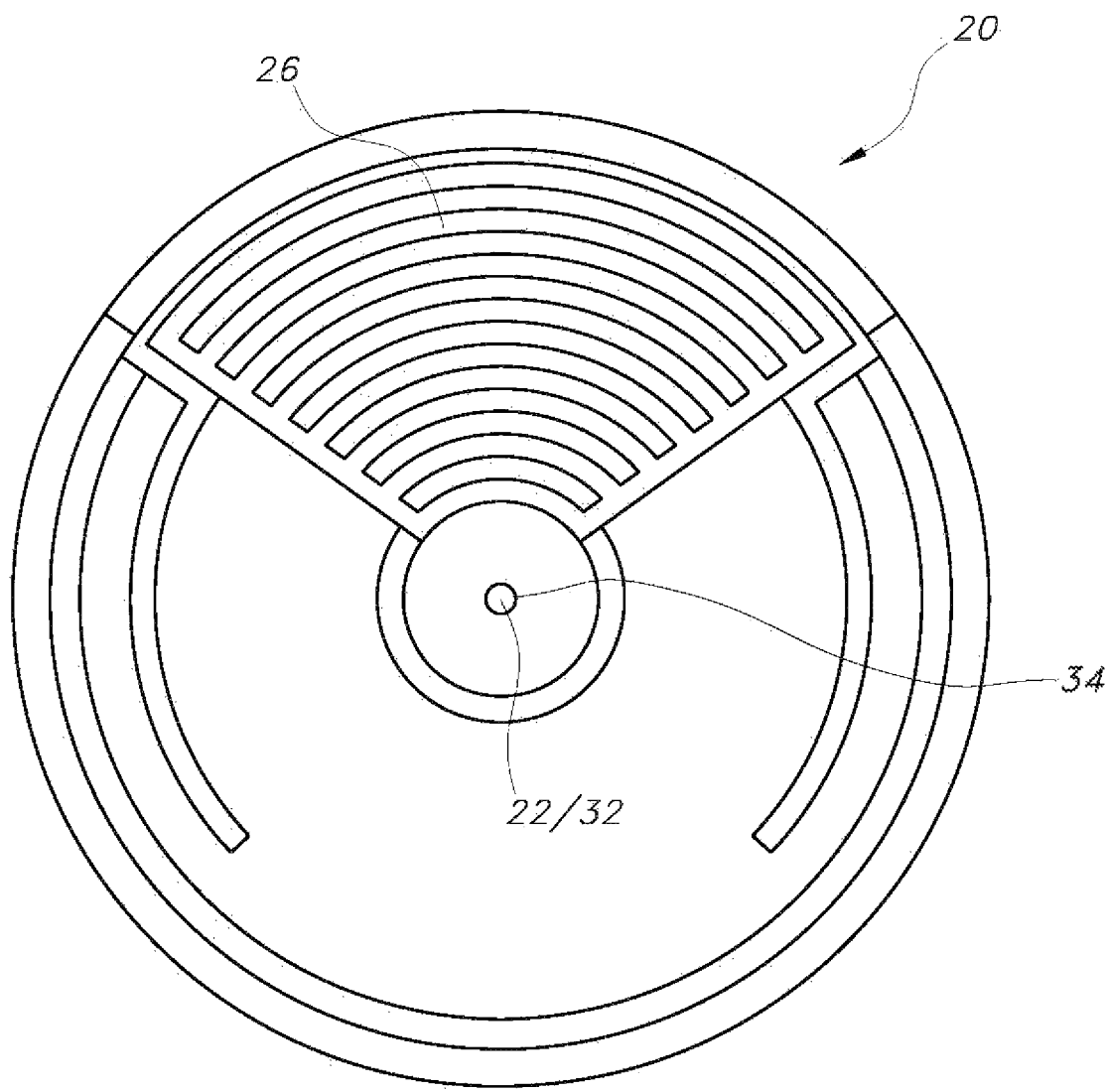
FIG. 3 is a top view of the actuator.
Figure 4:
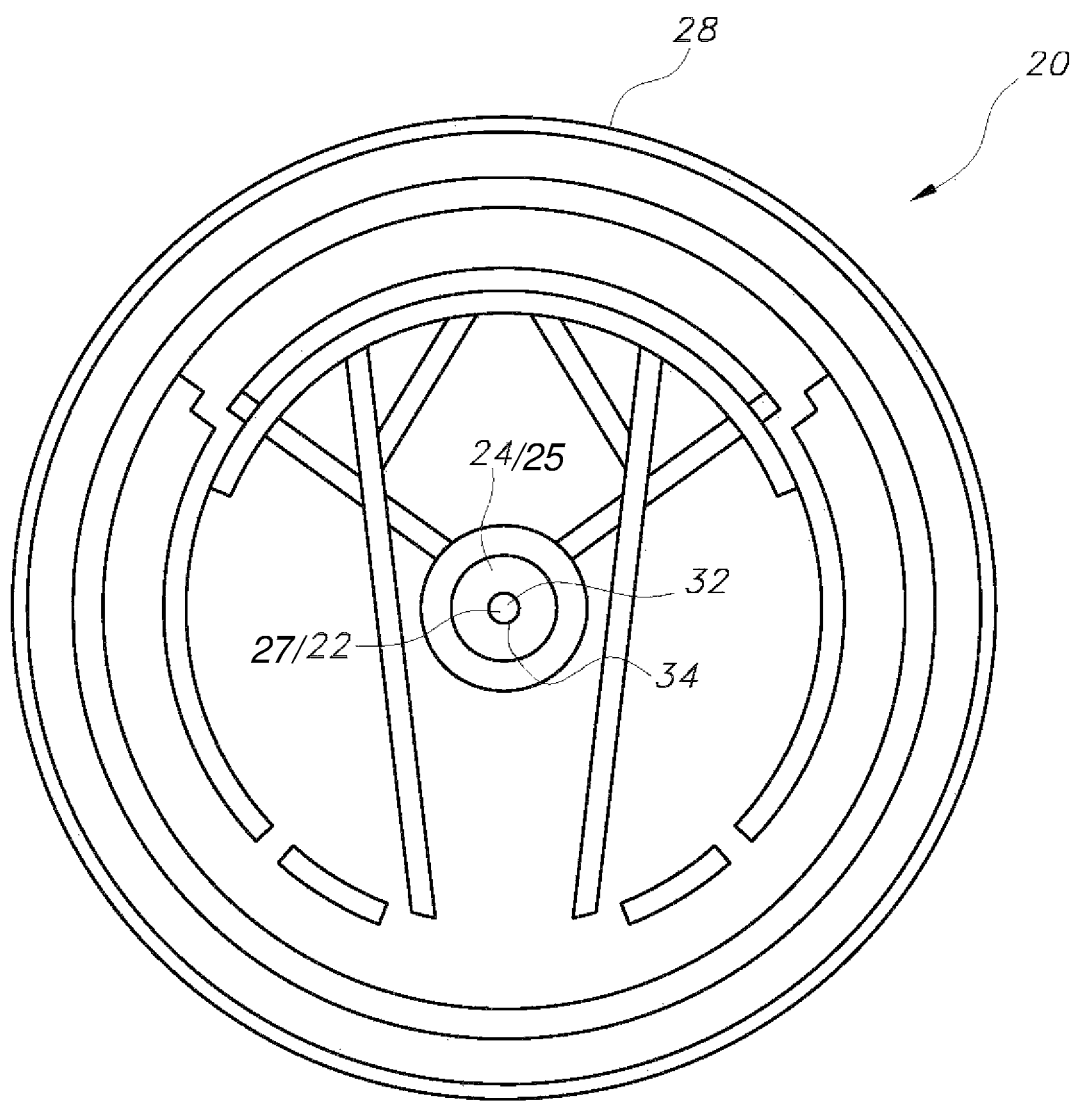
FIG. 4 is a bottom view of the actuator.
Figure 5:
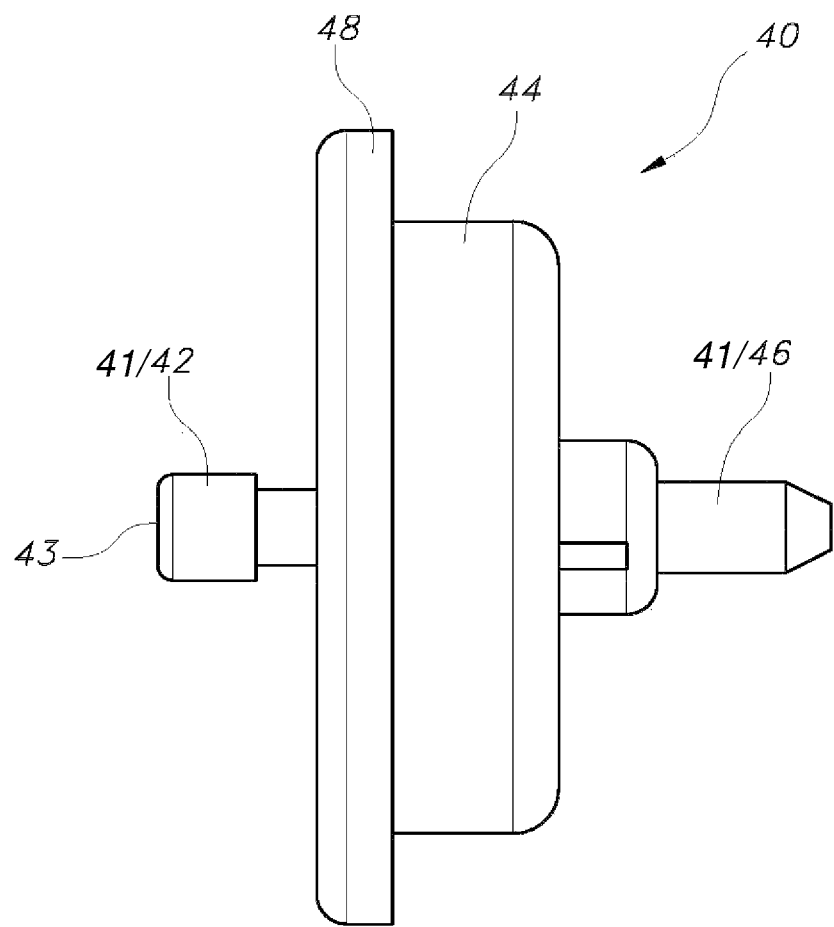
FIG. 5 is a side view of the valve.

The actuator 20, illustrated in FIGS. 2-4, includes an actuator orifice 22, a valve stem receptacle 24 that has a stop 25 with stop opening 27, an activation lever 26 and an attachment lip 28. The valve 40, primarily illustrated in FIG. 5, is a conventional inverted valve that is used with aerosol cans that are intended to spray foams, gels and liquids, and includes an upper stem 42 with valve opening 43, housing 44, a lower stem 46 and a side wall 48.

The valve 40 snaps into the actuator 20 with the attachment lip 28 fitting tightly over and around the side wall 48. The upper stem 42 fits tightly into the stem receptacle 24, with the top of the upper valve stem 42 pressed tightly against the stop 25. The valve opening 43 is approximately the same size as the stop opening 27. The valve 40 is attached to the can 10 by any suitable means, for example, by using a conventional crimping process, and the lower stem 46 is inserted into the can 10. Pressing the activation lever 26 activates the valve 40 which release the mixture from the can 10.

Figure 6:
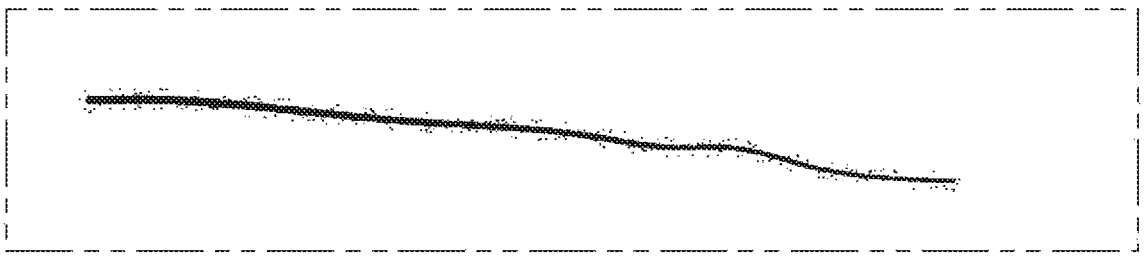
FIG. 6 is an illustration of a neat and well form lined created by the claimed invention.
Figure 7:
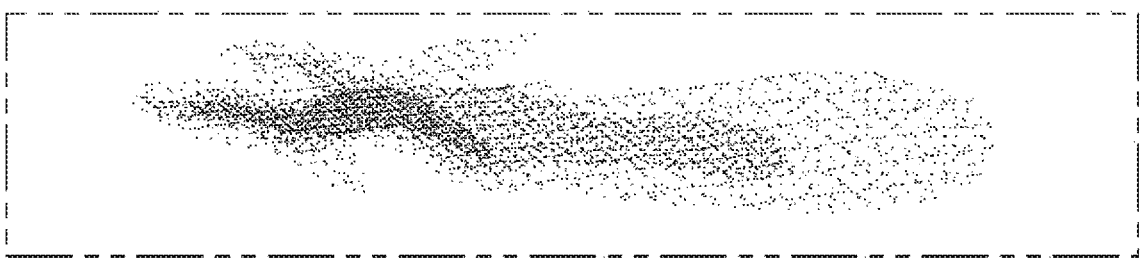
FIG. 7 is an illustration of a line formed by the prior art from an upright standing position.

The actuator orifice 22 is approximately cylindrical in shape, illustrated in FIGS. 2 and 4, with a round opening 32 and straight sidewalls 34. The opening 32 has a diameter between 0.4 millimeters and 0.9 millimeters, with a preferred diameter of between 0.6 and 0.7 millimeters. In the embodiment shown, the opening 32 is 0.63 millimeters. The straight sidewalls 34 are at least 1 millimeter in length, with a preferred length of approximately 2 millimeters. The size and shape of the actuator orifice 22 provides for a narrow stream of the mixture that experiences little to no agitation as the mixture exits the can 10 through the valve 40 and actuator 20. As a result, the liquid mixture experiences significant agitation for the first time when it comes into contact with a surface, creating a neat foam line, such as the one illustrated in FIG. 6, upon impact.

The vanishing-foam formula includes a surfactant that represents between approximately 3% and 10%, by weight, of the total mixture, preferably approximately 4%. The increased percentage of surfactant over conventional formulas for vanishing foams allows for the creation of sufficient foam bubbles when used with an actuator that provides little to no agitation as the formula is delivered onto a surface. The surfactant allows the foam to vanish in approximately between 30 seconds and 7 minutes, depending on how much of the mixture is sprayed on one spot on a surface and depending on the external environmental conditions such as the temperature and humidity.

The remainder of the formula is conventional, and comprises approximately 80% water, between 4% and 16% propellant, with the remainder comprising of conventional preservatives. A number of conventional propellants are suitable for use with this formula, such as a mixture of isobutane/propane (A-46), A-45, or Dimethyle Ether (DME).

Once placed inside the aerosol can 10 the formula is under a relatively low level of pressure, preferably between 60 and 80 PSI. This level of pressure is sufficient to ensure that the flow rate of the vanishing-foam formula exiting the can 10 through the valve 40 and out of the actuator 20 is a constant flow such that no spaces or gaps in mixture exist inside the delivery device 100. Were the flow rate not sufficient, agitation may occur inside of the delivery device 100, thereby causing premature foaming.

Providing a vanishing foam formula that includes between 3% and 10% surfactant with the delivery device 100 allows a user to stand upright in a common manner, hold the can in an inverted manner and point the can towards the ground at a vertical or near vertical angle and create a narrow stream of vanishing formula that, upon impact, results in a neat line of foam with little to no splattering.

It is understood that the embodiments described herein are merely illustrative of the present invention. Variations in the construction of the device and formula may be contemplated by one skilled in the art without limiting the intended scope of the invention herein disclosed and as defined by the following claims.

What is claimed is:

1. A device adapted to deliver a vanishing foam formula onto a surface, the device comprising:

- an aerosol can that contains the vanishing foam formula under pressure;
- a valve secured to a top of the aerosol can, the valve having a valve stem with a valve opening that extends into the aerosol can;
- an actuator secured to the top of the valve, the actuator including an actuator stem and valve stem receptacle, the actuator stem having a cylindrical shape with straight sidewalls, the valve stem receptacle including an actuator stem opening;
- wherein the actuator stem opening is approximately the same size as the valve stem opening; and
- wherein actuating the actuator causes the vanishing foam formula to exit the aerosol can through the actuator stem and create a vanishing foam when the vanishing foam formula hits a surface and experiences agitation for the first time.

2. The device of claim 1 wherein the actuator stem is between approximately 0.4 and 0.9 millimeters in diameter.

3. The device of claim 2 wherein the actuator's straight sidewalls are between approximately 1.0 and 2.0 millimeters in length.

4. The device of claim 3 wherein the pressure in the aerosol can is between approximately 60 and 80 PSI.

5. The device of claim 4 wherein the actuator stem is between approximately 0.6 and 0.7 millimeters.

6. The device of claim 1 wherein the vanishing foam formula contains between 3% and 10% surfactant.

7. The device of claim 1 wherein the vanishing foam formula contains approximately 4% surfactant.

* * * * *